(12) United States Patent
Wipasuramonton et al.

(10) Patent No.: US 8,052,168 B2
(45) Date of Patent: Nov. 8, 2011

(54) MULTI-CHAMBERED SIDE AIRBAG (75) Inventors: Pongdet Paul Wipasuramonton, Rochester, MI (US); Jonathan Lee Clarke, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/078,184

(22) Filed: Mar. 27, 2008

(65) Prior Publication Data
US 2009/0020987 A1 Jan. 22, 2009

Related U.S. Application Data (60) Provisional application No. 60/929,998, filed on Jul. 20, 2007.

(51) Int. Cl.
*B60R 21/233* (2006.01)
*B60R 21/207* (2006.01)
(52) U.S. Cl. ..................... 280/730.2; 280/729
(58) Field of Classification Search ............... 280/730.2, 280/729, 730.1
See application file for complete search history.

(56) References Cited

U.S. PATENT DOCUMENTS

| 5,845,935 | A | * | 12/1998 | Enders et al. | 280/743.2 |
|---|---|---|---|---|---|
| 5,899,490 | A | * | 5/1999 | Wipasuramonton et al. | 280/730.2 |
| 6,270,113 | B1 | * | 8/2001 | Wipasuramonton et al. | 280/730.2 |
| 6,279,944 | B1 | * | 8/2001 | Wipasuramonton et al. | 280/730.2 |
| 6,364,348 | B1 | * | 4/2002 | Jang et al. | 280/730.2 |
| 6,478,329 | B1 | * | 11/2002 | Yokoyama | 280/729 |
| 7,163,233 | B2 | * | 1/2007 | Kino | 280/730.2 |
| 2003/0006587 | A1 | * | 1/2003 | Jang et al. | 280/730.2 |
| 2006/0131845 | A1 | * | 6/2006 | Belwafa et al. | 280/729 |
| 2007/0290488 | A1 | * | 12/2007 | Taguchi et al. | 280/730.2 |

FOREIGN PATENT DOCUMENTS

WO    WO 00/20260    *    4/2000

* cited by examiner

*Primary Examiner* — Paul N Dickson
*Assistant Examiner* — Keith Frisby
(74) *Attorney, Agent, or Firm* — Foley & Lardner LLP (57) ABSTRACT

A multi-chambered airbag is sewn in a flat or 2-D state. The airbag includes a first fabric panel, a second fabric panel of a shape similar to the first fabric panel and coupled to at least a portion of a periphery of the first fabric panel, and a separator panel coupled to the first and second fabric panels. The separator panel forms two or more interior chambers in the airbag. The separator panel includes a venting mechanism to temporarily block the flow of inflation gases into one or more chambers in the airbag or to the outside.

16 Claims, 7 Drawing Sheets

MULTI-CHAMBERED SIDE AIRBAG

CROSS-REFERENCE TO RELATED PATENT APPLICATIONS

This application claims priority to U.S. Provisional Application No. 60/929,998, filed Jul. 20, 2007, which is incorporated herein by reference in its entirety.

FIELD

The present invention relates generally to the field of vehicle occupant protection systems incorporating airbags and specifically, to an improved multi-chambered side airbag cushion.

BACKGROUND

Current multi-chambered side airbag cushions are sometimes designed to have multiple chambers. For example, the airbag cushion may have three chambers. The upper chamber is aligned with the shoulder of the occupant, the middle chamber is aligned with the ribcage of the occupant, and the lower chamber is aligned with the pelvis of the occupant. The chambers are formed by coupling a front panel to the rear panel with a two-dimensional (2-D) or a three dimensional (3-D) separator.

A 2-D separator, such as a sewn seam or stitch, couples the front panel directly to the rear panel. However, a 2-D separator in the form of a stitch may compromise the fabric strength of the front and rear panels. 2-D separators also form chambers with thin sectional shapes that may have reduced stability. Venting between the chambers through the 2-D separator creates high-stress points.

A 3-D separator couples the front panel to the rear panel with a third panel, such as a fabric strip that is generally perpendicular to the front and rear panels. However, 3-D separators generally are limited to linear separators to aid sewing and to minimize the bunch-up of the fabric when the cushion is inflated. The 3-D separator may also be difficult to fold when the airbag cushion is in an undeployed state.

SUMMARY

One embodiment of the invention relates to a multi-chambered airbag. The airbag comprises a first fabric panel; a second fabric panel of a shape similar to the first fabric panel and coupled to at least a portion of a periphery of the first fabric panel; and a separator panel coupled to the first and second fabric panels.

Another exemplary embodiment provides a method of forming a multi-chambered side airbag. The method comprises: providing a first fabric panel, a second fabric panel, and a separator panel; coupling a first side edge of the separator panel to the first fabric panel and a second side edge of the separator panel to the second fabric panel; and coupling the first fabric panel to the second fabric panel by sewing a seam around at least a portion of a periphery of the fabric panels. The coupling of the first fabric panel and second fabric panel together occurs after coupling the separator panel to the first and second fabric panels.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 19 A is a front view of a vent according to another exemplary embodiment in an initial position before the airbag is inflated.

DETAILED DESCRIPTION

One exemplary embodiment relates to a multi-chambered side airbag cushion. The cushion includes a first fabric panel, a second fabric panel that is similar to the first fabric panel and is coupled to at least a portion of the periphery of the first fabric panel, and a separator fabric panel that is coupled to the first panel and the second panel. The separator panel may form two or more interior chambers in the airbag cushion.

In another embodiment, the third fabric panel comprises a vent mechanism.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Figure 1:
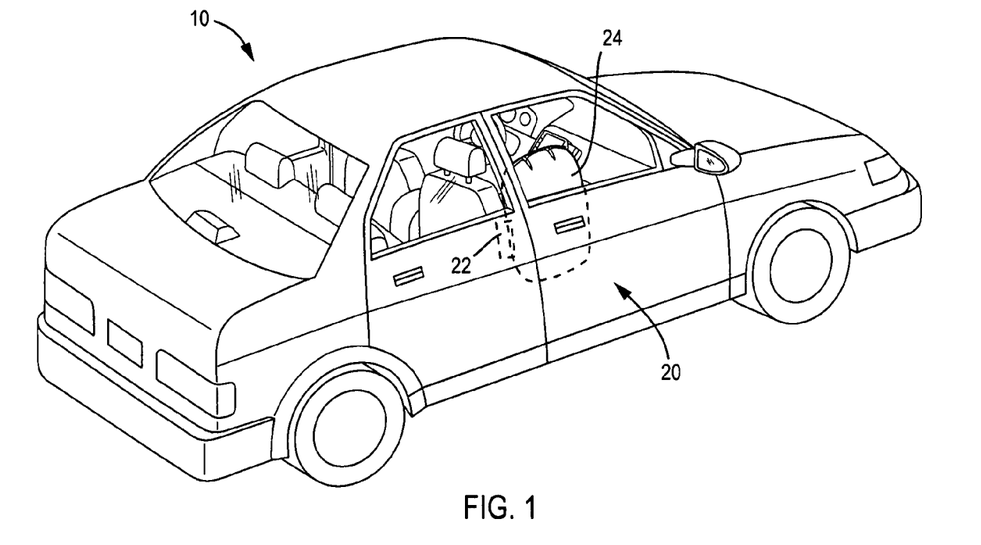
FIG. 1 is an isometric view of a vehicle including a side airbag module with a multi-chambered airbag cushion according to an exemplary embodiment.
Figure 2:
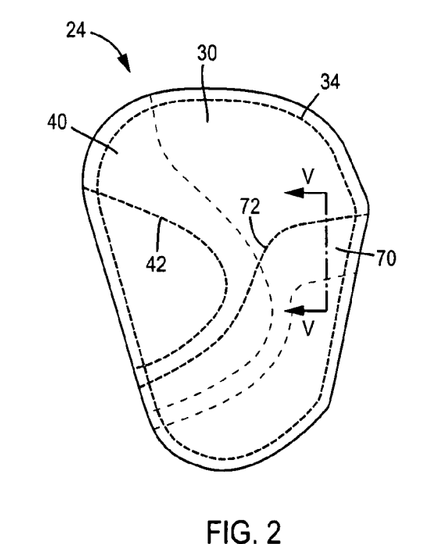
FIG. 2 is a front view of a multi-chambered airbag cushion according to an exemplary embodiment in a deflated configuration.
Figure 3:
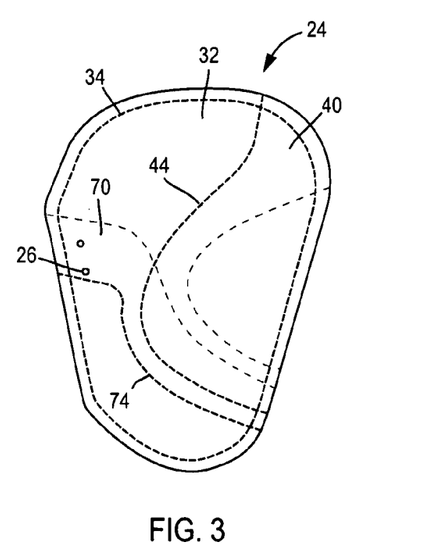
FIG. 3 is a rear view of the multi-chambered airbag cushion of FIG. 2 in a deflated configuration.

Referring to FIG. 1, a vehicle 10 is shown according to an exemplary embodiment. The vehicle 10, shown as a 4-door sedan, includes one or more seats that are coupled to the vehicle and are configured to receive an occupant. Airbags may be provided at a variety of places within the vehicle to protect an occupant of the vehicle in a variety of impact scenarios. For example, airbags may be provided in the dashboard, proximate to the steering wheel, in the vehicle seats, in the door trim panels, in the headliner, etc. Side airbag modules 20 may be provided that are configured to protect an occupant of the vehicle 10 in a side impact or rollover. The side airbag modules 20 includes a cushion 24 that is formed by fabric panels 30 and 32 (such as nylon) and a gas generator or inflator 22 that inflates the cushion 24. The side airbag modules 20 may be deployed from the vehicle seat, the door panel, or any other suitable interior component.

Referring in general to FIGS. 2-6, the side airbag cushion 24 is shown according to an exemplary embodiment. The cushion 24 includes a first or front panel 30 (e.g., a panel proximate to the occupant when the cushion 24 is inflated), a second or rear panel 32 (e.g., a panel proximate to the vehicle frame when the cushion 24 is inflated), and separators 40 and 70 that are coupled to the front panel 30 and the rear panel 32. The first panel 30 and the second panel 32 are similarly shaped panels of a suitable fabric, such as nylon. At least a portion of the periphery of the first panel 30 and the second panel 32 are coupled together with a first stitch 34 to form an interior chamber. The interior chamber is inflated with a gas produced by an inflator or gas generator 22. The inflator 22 may produce a gas by, for instance, a pyrotechnic process. The inflator 22 is coupled to the vehicle frame and may help anchor the airbag cushion 24 to the vehicle frame at a mounting location 26. The inflator 22 may be provided within the interior of the cushion 24 or may be provided at least partially outside of the cushion 24 and extend into the interior through an opening in the cushion 24 (e.g., a gap in stitch 34).

A first separator 40 is coupled to the front panel 30 with a second stitch 42 and to the rear panel with a third stitch 44. A second separator 70 is coupled to the front panel 30 with a fourth stitch 72 and to the rear panel 32 with a fifth stitch 74. Separators 40 and 70 separate the airbag cushion 24 into an upper region or chamber 50, a middle region or chamber 52, and a lower region or chamber 54. The airbag cushion 24 is generally formed by first coupling the separators 40 and 70 to the front panel 30 and the rear panel 32 with stitches 42, 44, 72, and 74 and then coupling the front panel 30 to the rear panel 32 with a stitch 34.

The multiple chambers are configured to support different portions of the occupant's body in an impact situation. Each chamber may be finely tuned to meet the requirements for different occupant body regions. For example, according to one embodiment, the upper chamber 50 is configured to support the occupant's shoulder, the middle chamber 52 is configured to support the occupant's midsection, and the lower chamber 54 is configured to support the occupant's pelvis.

Figure 4:
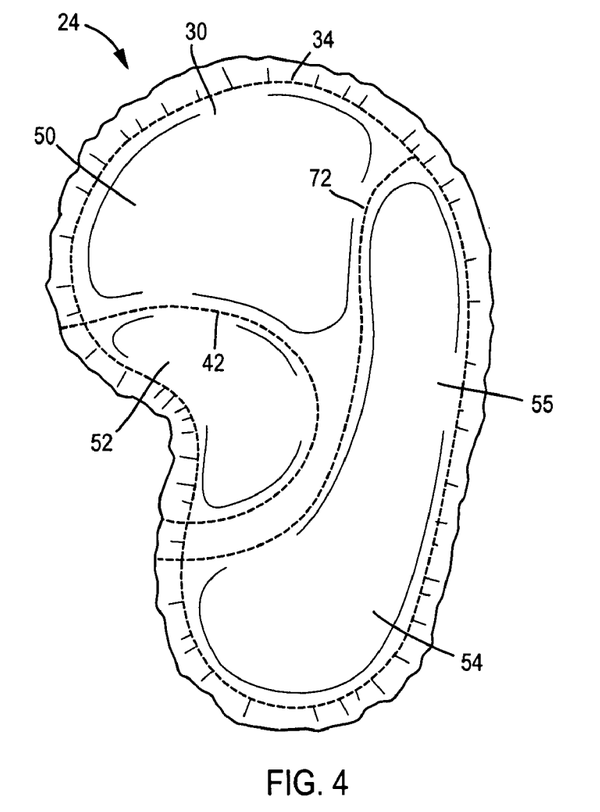
FIG. 4 is a front view of the multi-chambered airbag cushion of FIG. 2 in an inflated configuration.

Lower chamber 54 is formed with a vertical cylindrical portion 55 when the cushion 24 is inflated, shown best in FIG. 4. The vertical cylindrical portion 55 is formed near the seat mounting point 26 and provides stability for the lower chamber 54. The added stability helps to consistently position the lower chamber 54 in relation to the occupant's hip. The vertical cylindrical portion 55 further adds stiffness to the lower chamber 54 to prevent it from getting pushed out of the way in a crash. In a preferred embodiment, the diameter of the vertical cylindrical portion 55 is at least 100 mm for the majority of its height. The height of the vertical cylindrical portion 55 extends up to at least the lower airbag mounting location 26.

Figure 5:
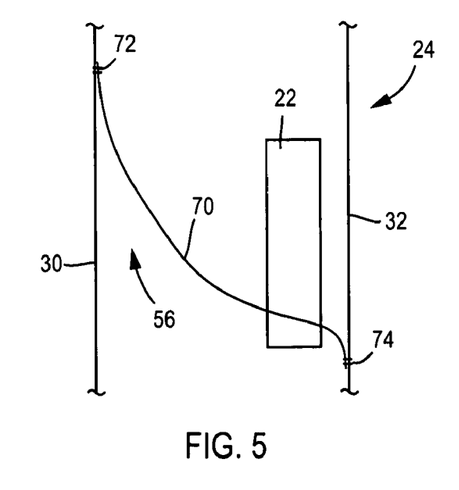
FIG. 5 is a cross section (section V-V) of a portion of the multi-chambered cushion of FIG. 2 according to an exemplary embodiment.
Figure 6:
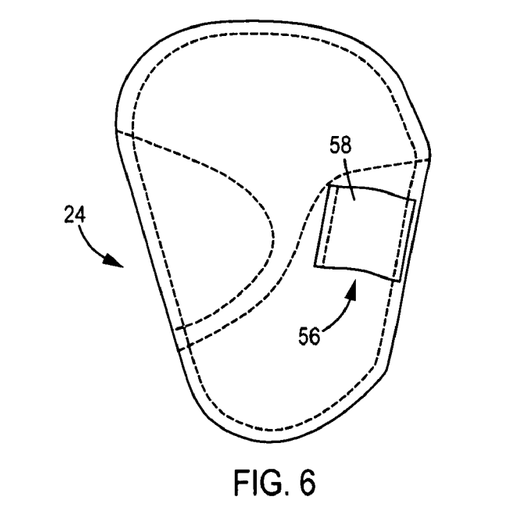
FIG. 6 is a front view of the multi-chambered cushion of FIG. 2 including a pocket for folding a portion of the cushion into according to an exemplary embodiment.

As shown best in FIG. 5, the second separator 70 creates a pocket 56 next to the inflator 22 into which the lower chamber 54 may be folded when the cushion is in a folded or stowed configuration. Referring to FIG. 6 and according to another exemplary embodiment, the pocket 56 may be formed on the exterior of the cushion 24 by sewing a piece of fabric such as patch 58 to the outside of the cushion.

Figure 7A:
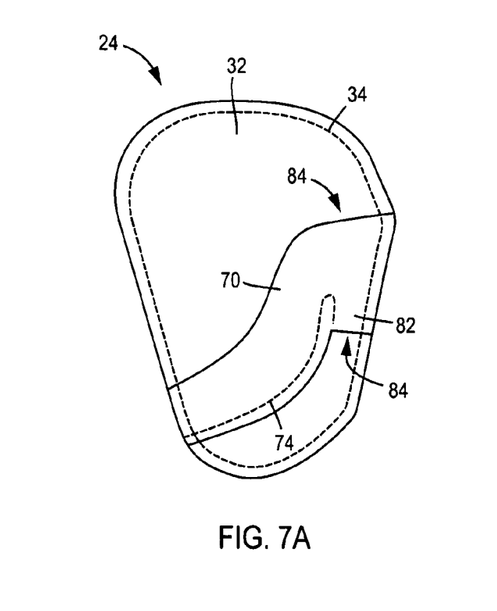
FIG. 7A is a front view of a multi-chambered airbag with the front panel removed to show a mechanism for securing the inflator to the cushion such that it is able to inflate two chambers of the airbag simultaneously according to one exemplary embodiment.
Figure 7B:
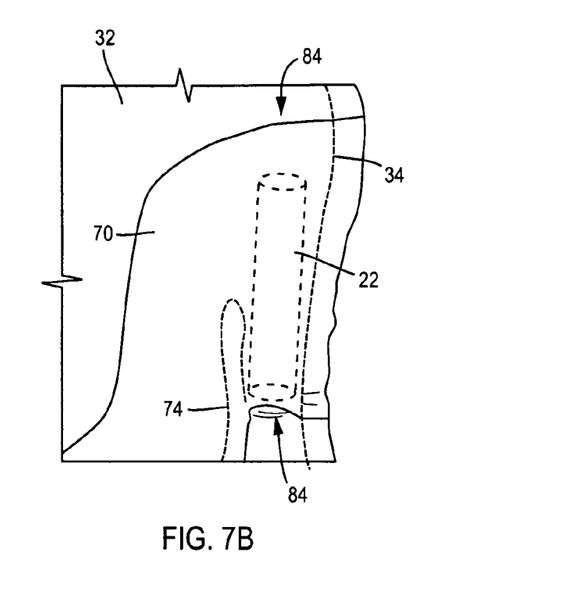
FIG. 7B is a front view of a portion of the airbag of FIG. 7A showing an inflator coupled to the cushion according to an exemplary embodiment.
Figure 8A:
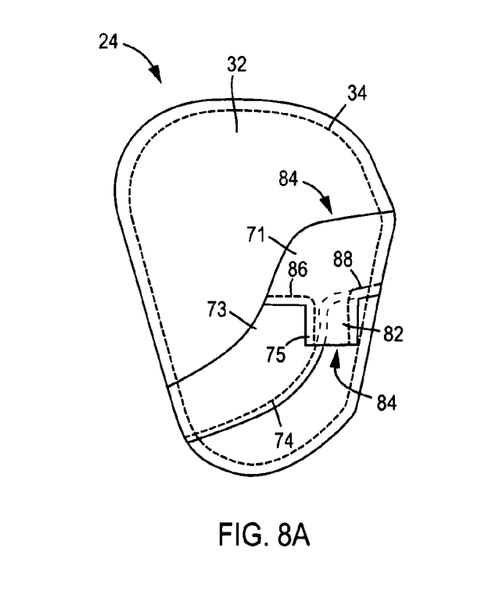
FIG. 8A is a front view of a multi-chambered airbag with the front panel removed to show a mechanism for securing the inflator to the cushion such that it is able to inflate two chambers of the airbag simultaneously according to another exemplary embodiment.
Figure 8B:
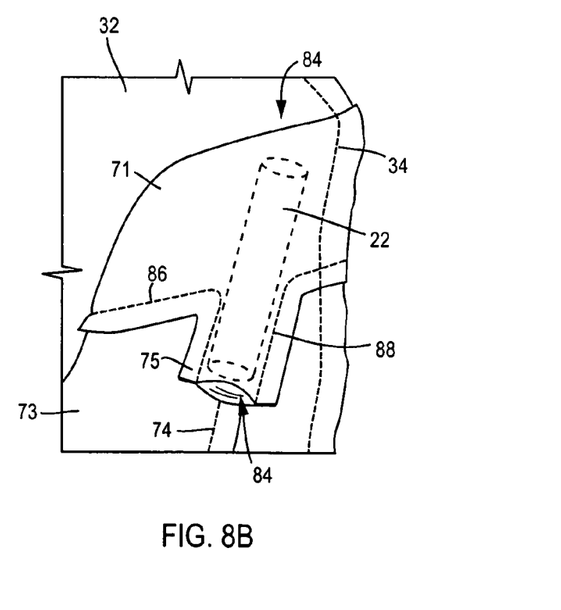
FIG. 8B is a front view of a portion of the airbag of FIG. 8A showing an inflator coupled to the cushion according to an exemplary embodiment.
Figure 9:
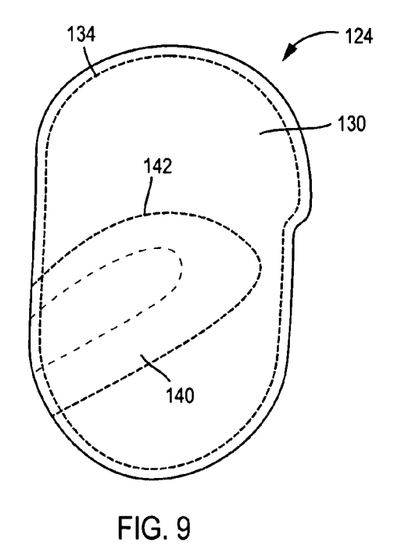
FIG. 9 is a front view of a multi-chambered airbag cushion according to an exemplary embodiment in a deflated configuration.
Figure 10:
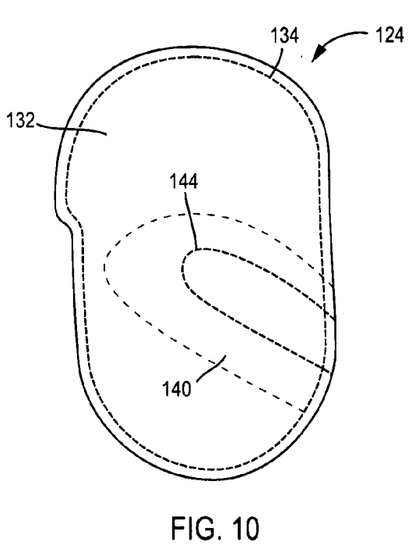
FIG. 10 is a rear view of the multi-chambered airbag cushion of FIG. 9 in a deflated configuration.
Figure 11:
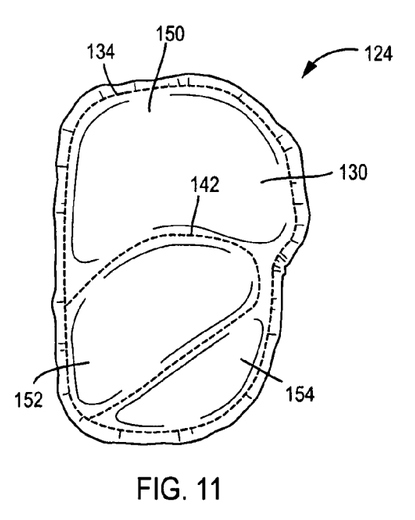
FIG. 11 is a front view of the multi-chambered airbag cushion of FIG. 9 in an inflated configuration.
Figure 12:
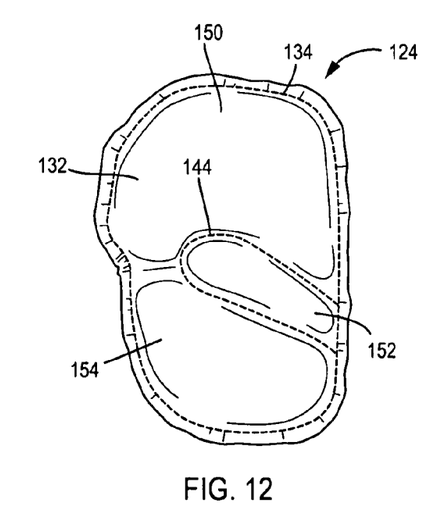
FIG. 12 is a rear view of the multi-chambered airbag cushion of FIG. 9 in an inflated configuration.
Figure 13:
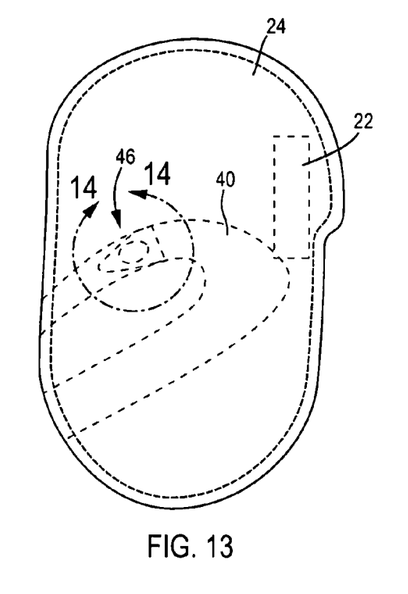
FIG. 13 is a front view of a multi-chambered airbag cushion in a deflated configuration showing the positioning of a vent according to one exemplary embodiment.
Figure 14:
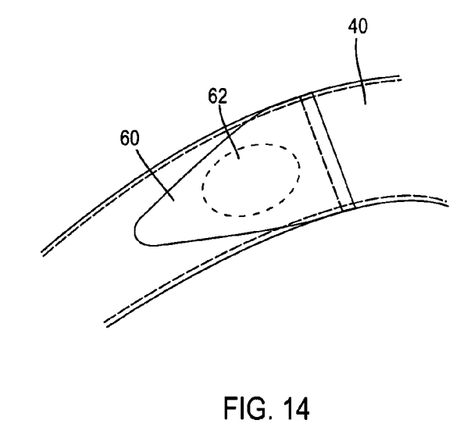
FIG. 14 is a front view of a separator including a vent according to an exemplary embodiment.
Figure 15A:
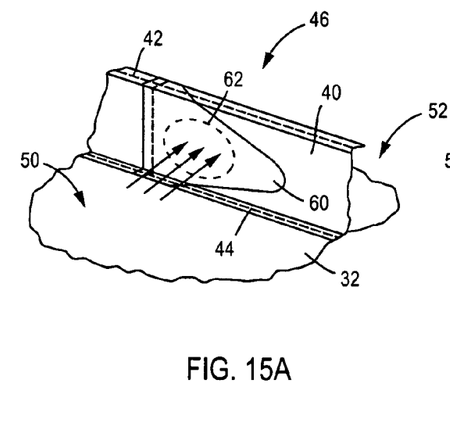
FIG. 15A is an isometric view of a vent for an airbag cushion according to an exemplary embodiment in a closed position.
Figure 15B:
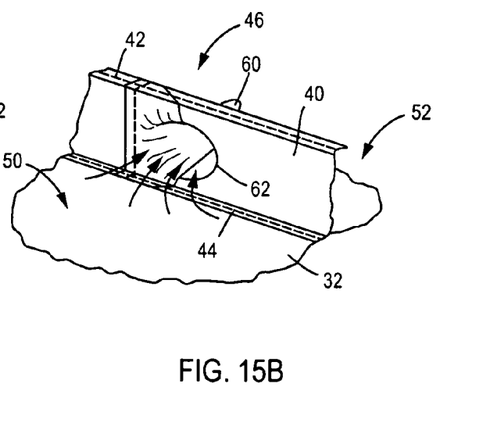
FIG. 15B is an isometric view of the vent of FIG. 15A in an open position.

The inflator 22 may be placed inside a gas diffuser and pass through chamber separator 70 to distribute gas into two chambers at once (e.g., upper chamber 50 and lower chamber 54). Distributing inflating gas into multiple chambers simultaneously allows the airbag module 20 to use a great range of pressures independently in each chamber. According to one exemplary embodiment, shown in FIGS. 7A and 7B, the opening is created by sewing the separator 70 to one of the panels (such as rear panel 32) such that a channel or pocket 82 is formed by stitches 74 and 34. The channel 82 receives an inflator with gas diffuser 22 that expels inflating gas out of both ends. The inflating gas enters two chambers simultaneously through openings 84 formed by separator 70 and rear panel 32. According to another exemplary embodiment, shown in FIGS. 8A and 8B, the separator may be formed by a first panel 71 and a second panel 73. The first panel 71 and the second panel 73 each form extensions or tabs 75. The tabs 75 are coupled together with stitches 86 and 88 to form a channel or pocket 82 with the tabs 75. The channel 82 receives an inflator with gas diffuser 22 that expels inflating gas out of both ends. The inflating gas enters two chambers simultaneously through openings.

According to another exemplary embodiment, shown in FIGS. 9-12, the airbag cushion 124, may be divided into multiple chambers with a single separator 140. At least a portion of the periphery of the first panel 130 and the second panel 132 are coupled together with a first stitch 134 to form an interior chamber. The interior chamber is inflated with a gas produced by an inflator or gas generator (not shown). The inflator may be similar to inflator 22 described above.

The separator 140 is coupled to the front panel 130 with a second stitch 142 along one edge, and coupled to the rear panel 132 with a third stitch 144 along the opposite edge. The separator 140 is coupled to the front panel 130 and rear panel 132 in a 2-D or flat state. This arrangement allows the panels 130 and 132 and the separator 140 to lay flat when being sewn and reduces the chance of the fabric bunching up. The separator 140 may be a variety of shapes and sizes as long as the separator 140 fits the profile of the front panel 130 and rear panel 132 and there is enough material to sew the separator 140 to the front panel 130 and the rear panel 132. One exemplary separator 140 is generally U-shaped and separates the airbag cushion 124 into an upper region or chamber 150, a middle region or chamber 152, and a lower region or chamber 154.

Cushions 24 and 124 may include one or more vents 46 that allow the chambers to be in fluid communication with each other. Venting between chambers and to the outside of the cushion may be delayed by vents 46 to enhance performance of the airbag module 20. The vent 46 may be configured to selectively inflate one or more of the chambers depending on the occupant being protected by the airbag. For instance, a 50th percentile male may trigger the vent 46 to activate and cause one or more of the chambers to inflate while a 5th percentile female would not trigger the vent 46. While the vents described below will be discussed as generally being provided on separator 40, it should be understood that similar vents may be provided on any separator in the cushion 24 or on the front panel 30 or rear panel 32 of the cushion 24.

According to one exemplary embodiment, shown in FIGS. 13-15B, the vent 46 includes a flap 60 that is disposed over an opening 62 in the separator 40. The flap 60 is provided on the upper chamber 50 side of the separator 40. When the airbag cushion 24 is inflated, gas flows from the gas generator 22 into the upper chamber 50 and the lower chamber 54. In a side impact or rollover event, the occupant generally strikes the upper chamber 50 and the lower chamber 54 with their shoulder and pelvis, respectively. When the pressure difference between the upper chamber 50 and the middle chamber 52 reaches a predetermined threshold, the flap 60 is forced through the opening 62, allowing the gas to pass through the opening 62 from the upper chamber 50 to the middle chamber 52. As gas enters the middle chamber 52, the middle chamber 52 cushions the impact of the occupant's ribcage. The pressure difference at which the flap 60 will be forced through the opening 62 may be varied by controlling the relative size of the flap 60 and of the opening 62 and/or by controlling the material of the flap 60. For example, the flap 60 may be controlled by controlling the type of material used to form the flap 60, controlling the thickness of the material used to form the flap 60, and/or controlling the shape of the flap 60.

Another exemplary vent 146 is shown in FIGS. 16-18B. The separator 40 includes two panels 160 and 162 that have ends with corresponding tabs 166. The tabs 166 are coupled together with stitches that form a channel 168 between the two panels. The size and shape of the channel is determined based on the output of the inflator 22. According to a preferred embodiment, the channel 168 has a width between 10 and 80 mm. In a deflated configuration, the tabs 166 lay flat against one of the panels 160 and 162 on the upper chamber 50 side of the separator 40 and gas is substantially prevented from passing through the channel 168 as shown in FIG. 18A.

Figure 16:
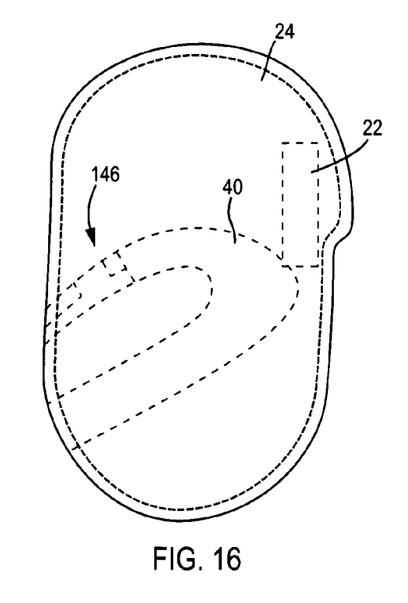
FIG. 16 is a front view of a separator including a vent according to another exemplary embodiment.
Figure 17:
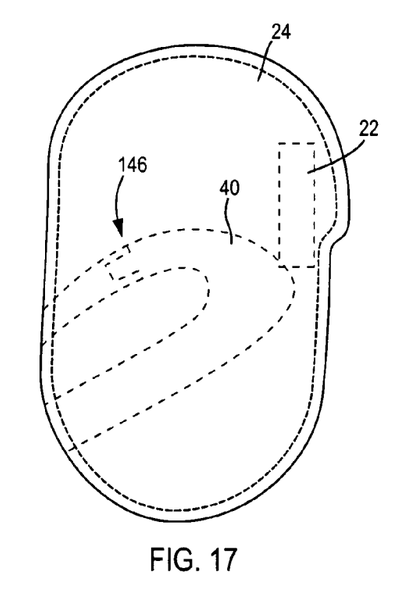
FIG. 17 is a front view of a separator including a vent according to another exemplary embodiment.
Figure 18A:
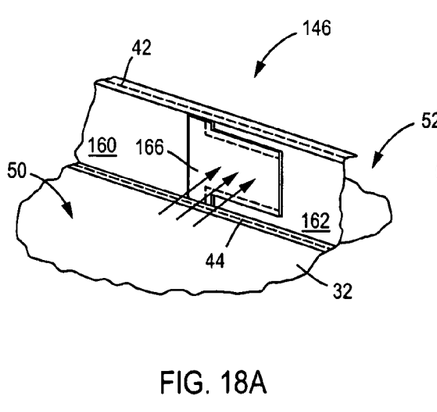
FIG. 18A is an isometric view of a vent for an airbag cushion according to another exemplary embodiment in a closed position.
Figure 18B:
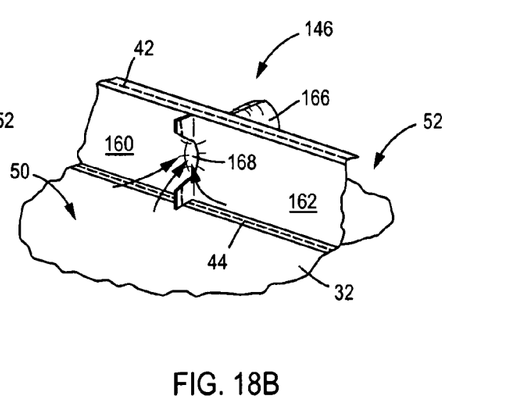
FIG. 18B is an isometric view of the vent of FIG. 18A in an open position.

When the airbag cushion 24 is inflated, gas flows from the gas generator 22 into the upper chamber 50 and the lower chamber 54. In a side impact of rollover event, the occupant generally strikes the upper chamber 50 and the lower chamber 54 with their shoulder and pelvis, respectively. When the pressure difference between the upper chamber 50 and the middle chamber 52 reaches a predetermined threshold, the tabs 166 are forced through the channel 168, essentially turning the vent 146 inside-out as shown in FIG. 18B. When the vent 146 is forced inside out, the upper chamber 50 and the middle chamber 52 are in fluid communication and gas is allowed to pass through the channel 168 from the upper chamber 50 to the middle chamber 52. As gas enters the middle chamber 52, the middle chamber 52 inflates so that it may cushion the impact of the occupant's ribcage. The pressure difference at which the tabs 166 will be turned inside-out may be adjusted by controlling the relative size of the tabs 166 and of the width and length of the channel 168. As shown in FIGS. 16 and 17, the tabs 166 may be oriented in a variety of directions relative to the panels 160 and 162 of the separator 40. A tear stitch may be used at the outlet of the vent 166 for more pressure retention in the upstream chamber.

Figure 19A:
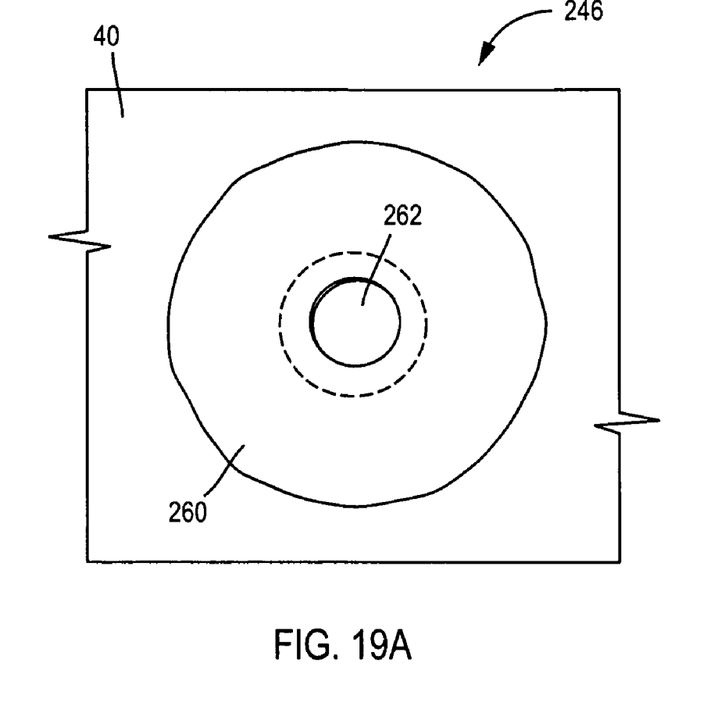
Figure 19B:
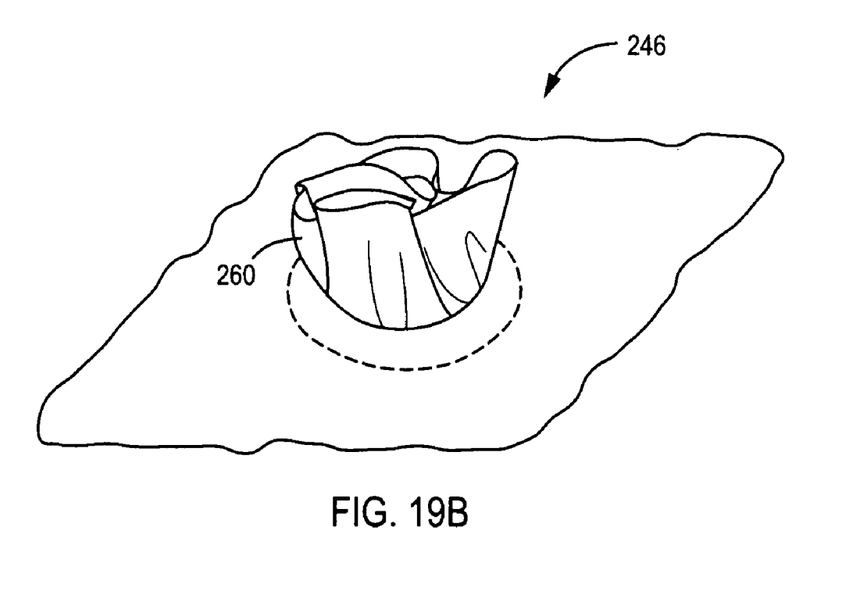
FIG. 19B is an isometric rear view of the vent of FIG. 19A after the airbag is inflated and the vent is in an open position.

According to another exemplary embodiment, shown in FIGS. 19A-19B, a vent 246 is formed by sewing a flap of material 260 to the upstream side of an opening 262 (e.g., the upper chamber 50 side of the separator 40). As gas begins to flow through the opening 262, the flap 260 is pushed through the opening 262, temporarily blocking the opening 262 and increasing pressure in upstream chamber. Once the flap 260 is pushed through the opening 262, as shown in FIG. 19B, gas is free to flow through the opening 262.

It is important to note that the construction and arrangement of the multi-chambered airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A method of forming a multi-chambered side airbag, comprising:
   providing a first fabric panel, a second fabric panel, and a separator panel;
   coupling a first side edge of the separator panel to the first fabric panel and a second side edge of the separator panel to the second fabric panel;
   coupling the first fabric panel to the second fabric panel by sewing a seam around at least a portion of a periphery of the fabric panels; and
   sewing the separator panel to the first and second fabric panels in a flat state so that the first and second fabric panels and the separator panel lie flat against one another after coupling and before inflation of the airbag,
   wherein the coupling of the first fabric panel and second fabric panel together occurs after coupling the separator panel to the first and second fabric panels,
   wherein the side airbag includes an upper airbag chamber and a lower airbag chamber,
   wherein the lower chamber includes a substantially vertical cylindrical shape in the inflated airbag, wherein the substantially vertical cylindrical shape has a diameter of at least 100 mm for a majority of a height of the cylindrical shape, wherein the substantially vertical cylindrical shape extends vertically upward from the lower chamber to at least a substantial midpoint of the airbag along a vertical direction of the airbag.

2. The method of claim 1, wherein the height of the cylindrical shape extends up to at least a lower airbag seat mounting location.

3. The method of claim 1, further comprising:
coupling a second separator panel to the first and second fabric panels;
forming three interior chambers in the airbag, wherein the three chambers include the upper airbag chamber, a middle airbag chamber, and the lower airbag chamber; and
wherein the substantially vertical cylindrical shape provides stability for the lower airbag chamber.

4. The method of claim 3, wherein one of the separator panels forms a pocket adjacent an inflator, the pocket configured to receive a folded portion of the airbag.

5. The method of claim 3, further comprising passing a diffuser through an opening in one of the separator panels to distribute inflation gas into at least two chambers.

6. The method of claim 1, wherein the separator panel is sewn to the first fabric panel along a first path located on the first fabric panel and is sewn to the second fabric panel along a second path located on the second fabric panel, wherein the first path and the second path are asymmetric about a plane extending between the first and second fabric panels.

7. The method of claim 1, wherein a seat mount location for the airbag is positioned at approximately the substantial midpoint of the airbag along the vertical direction of the airbag,
wherein the substantially vertical cylindrical shape extends vertically upwards to at least the seat mount location.

8. A multi-chambered airbag, comprising:
a first fabric panel;
a second fabric panel of a shape similar to the first fabric panel and coupled to at least a portion of a periphery of the first fabric panel; and
a first separator panel coupled to the first fabric panel along a first path located on the first fabric panel and coupled to the second fabric panel along a second path located on the second fabric panel,
wherein the first path and the second path are asymmetric about a plane extending between the first and second fabric panels,
wherein the airbag includes an upper airbag chamber and a lower airbag chamber,
wherein the lower chamber includes a substantially vertical cylindrical shape in the inflated airbag,
wherein the substantially vertical cylindrical shape has a diameter of at least 100 mm for a majority of a height of the cylindrical shape,
wherein the substantially vertical cylindrical shape extends vertically upward from the lower chamber to at least a substantial midpoint of the airbag along a vertical direction of the airbag.

9. The multi-chambered airbag of claim 8, further comprising a second separator panel coupled to the first fabric panel along a third path located on the first fabric panel and to the second fabric panel along a fourth path located on the second fabric panel, wherein the third path and the fourth path are asymmetric about a plane extending between the first and second fabric panels.

10. The multi-chambered airbag of claim 9, wherein the first and second separator panels separate the airbag into the upper airbag chamber, a middle airbag chamber, and the lower airbag chamber.

11. The multi-chambered airbag of claim 10, wherein the substantially vertical cylindrical shape is located in the inflated airbag near a seat mounting portion to provide stability for the lower airbag chamber.

12. The multi-chambered airbag of claim 8, wherein the height of the cylindrical shape extends up to at least a lower airbag seat mounting location.

13. The multi-chambered airbag of claim 8, wherein one of the separator panels forms a pocket adjacent an inflator, the pocket configured to receive a folded portion of the airbag.

14. The multi-chambered airbag of claim 8, further comprising a diffuser that passes through an opening in one of the separator panels to distribute inflation gas into at least two chambers.

15. The multi-chambered airbag of claim 8, wherein the airbag is a side airbag.

16. The multi-chambered airbag of claim 8, wherein a seat mount location for the airbag is positioned at approximately the substantial midpoint of the airbag along the vertical direction of the airbag,
wherein the substantially vertical cylindrical shape extends vertically upwards to at least the seat mount location.

\* \* \* \* \*